United States Patent [19]

Nakagawa et al.

[11] Patent Number: 5,080,380
[45] Date of Patent: Jan. 14, 1992

[54] MAGNETIC CHUCK

[75] Inventors: Tadahiro Nakagawa; Shizuma Tazuke; Masatoshi Arishiro, all of Kyoto, Japan

[73] Assignee: Murata Manufacturing Co., Ltd., Japan

[21] Appl. No.: 538,536

[22] Filed: Jun. 15, 1990

[30] Foreign Application Priority Data

Jun. 15, 1989 [JP] Japan .................. 1-153246

[51] Int. Cl.$^5$ ............................. B23B 31/28
[52] U.S. Cl. ........................... 279/1 M; 269/8
[58] Field of Search ............ 279/1 M, 4; 269/8

[56] References Cited

U.S. PATENT DOCUMENTS 3,010,054  11/1961  Goudsmit .................... 269/8
3,079,191  2/1963   Engelsted et al. ............ 269/8

FOREIGN PATENT DOCUMENTS 0079807  5/1983  European Pat. Off. .
1042948  9/1983  U.S.S.R. .................... 269/8
849128   9/1960  United Kingdom .

*Primary Examiner*—Daniel W. Howell
*Attorney, Agent, or Firm*—Ostrolenk, Faber, Gerb & Soffen

[57] ABSTRACT

A plurality of vertically extending cylinders are formed in the interior of a chuck body providing a chucking face on its lower surface. Pistons, in which permanent magnets are embedded, are vertically movably provided in respective ones of the cylinders. When compressed air is introduced into upper portions of the cylinders, the pistons are downwardly displaced so that the permanent magnets are relatively approached to the lower surface of the chuck body. Thus, the chucking face is supplied with magnetic force exceeding a prescribed level, to attract a holder holding electronic component chips, for example. When compressed air is introduced into lower portions of the cylinders, on the other hand, the pistons are upwardly displaced so that the permanent magnets are relatively separated from the lower surface of the chuck body. Thus, the chucking face is supplied with no magnetic force exceeding the prescribed level, so that the holder is separated from the chuck body.

9 Claims, 5 Drawing Sheets

MAGNETIC CHUCK

BACKGROUND OF THE INVENTION

1. Field of the Invention

The present invention relates to a magnetic chuck, and more particularly, it relates to a magnetic chuck which is suitable for handling a number of electronic components, for example, held by an appropriate holder.

2. Description of the Background Art

FIG. 6 is a principle diagram showing a conventional magnetic chuck 1, which is of interest to the present invention.

In this magnetic chuck 1, a holding plate 3 holds a plurality of permanent magnets 2, which are distributed at regular intervals. A magnetic plate 4 is opposed to the holding plate 3 holding the permanent magnets 2. Magnetic poles 5 and separators 6 are alternately formed in this magnetic plate 4. The magnetic poles 5 are distributed in the magnetic plate 4 at the same intervals as the permanent magnets 2, which are distributed in the holding plate 3. The holding plate 3 is movable in parallel with the magnetic plate 4 along an arrow 7, and can assume states shown on the left and right sides in FIG. 6.

In order to simplify illustration, the following description is made with reference to iron balls 8, which are objects to be chucked by this magnetic chuck 1.

In the state shown on the left side of FIG. 6, the permanent magnets 2 are vertically aligned with the magnetic poles 5 respectively, so that the magnetic plate 4 attracts the iron balls 8. Thus, a chucking operation is achieved.

In the state shown on the right side of FIG. 6, on the other hand, the permanent magnets 2 are vertically aligned with the separators 6 respectively. Therefore, the magnetic plate 4 is subjected to no magnetic attraction exceeding a prescribed level, and the iron balls 8 are downwardly separated from the magnetic plate 4.

In general, the magnetic chuck 1 having the aforementioned principle has been mainly designed for a machine such as a polishing machine, for example, with strong magnetic force. However, such a magnetic chuck 1 has the following disadvantages:

The magnetic force acting through the magnetic plate 4 is switched on/off by movement of the holding plate 3 along the arrow 7, while relatively strong force is required for such movement of the holding plate 3. Therefore, the holding plate 3 must be moved by a lever (not shown) having a magnification function. In general, such a lever must be provided in a state relatively largely projecting from the outline of the magnetic chuck 1. Further, it is not easy to enable remote control of this lever.

While a magnetic chuck using electromagnets is suitable for remote control, residual magnetism remains in off states of the electromagnets, to require an additional release mechanism for chucking lightweight objects.

In any case, conventional magnetic chucks have complicated structures and large outer configurations. Thus, considerably large spaces and carefulness are required in order to assemble the conventional magnetic chucks into various machines.

SUMMARY OF THE INVENTION

Accordingly, an object of the present invention is to provide a magnetic chuck, which can solve the aforementioned problems.

In order to solve the aforementioned technical problems, the magnetic chuck according to the present invention comprises a chuck body which provides a chucking face on its lower surface and is formed with a plurality of cylinders vertically extending through its interior. Pistons, in which permanent magnets are embedded, are vertically movably arranged in respective ones of the cylinders. The inventive magnetic chuck further comprises means for controlling pressures in the cylinders in order to vertically move the pistons in the cylinders.

In the magnetic chuck according to the present invention, the permanent magnets embedded in the pistons are approached to the chucking face, which is provided on the lower surface of the chuck body, when the pistons are downwardly moved in the cylinders by the pressure control means. Thus, attractive force is applied to the chucking face by magnetic force. When the pistons are upwardly moved in the cylinders by the pressure control means, on the other hand, the permanent magnets embedded in the pistons are relatively largely separated from the chucking face, whereby the chucking face is subjected to no attractive force exceeding a prescribed level.

According to the present invention, therefore, it is possible to compactly design the chuck body, forming a principal part of the magnetic chuck, in a free configuration. Further, the magnetic chuck requires no element such as a lever, which relatively largely projects from the same. Thus, the inventive magnetic chuck can be easily assembled into various machines.

The means for controlling the pressures in the cylinders can comprise pipes for introducing fluid, for example. Thus, the chucking operation of the inventive magnetic chuck can be switched on/off by remote control, by elongating such pipes.

Further, it is possible to readily obtain a magnetic chuck having various properties in relation to magnetic force supplied to its chucking face by changing the distance between the bottom surface of each cylinder and the chucking face, the stroke of the piston in each cylinder, the state of arrangement or density of the cylinders, the type of the permanent magnets used for the pistons, and the like. Thus, it is easy to change the magnetic force supplied to the chucking face or reduce residual magnetism in an off state, for example.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
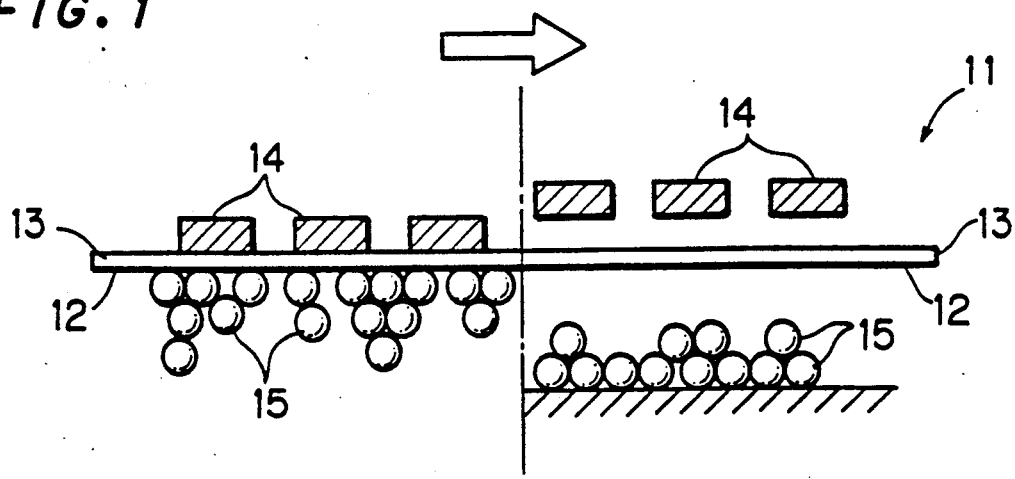
FIG. 1 is a principle diagram showing a magnetic chuck 11 according to the present invention.

FIG. 1 is a principle diagram showing a magnetic chuck 11 according to the present invention.

A plurality of permanent magnets 14 are arranged above a permeable plate 13, which provides a chucking face 12 on its lower surface. These permanent magnets 14 can assume states being approached to the permeable plate 13 as shown on the left side of FIG. 1 and states being separated from the permeable plate 13 as shown on the right side of FIG. 1. Such operations of the permanent magnets 14 are guided by cylinders, as will be clarified in the following description of an embodiment of the present invention. Pressures in such cylinders are so controlled as to provide the permanent magnets 14 with such operations.

When the permanent magnets 14 are approached to the permeable plate 13 as shown on the left side of FIG. 1, iron balls 15 are attracted by the chucking face 13 due to magnetic force applied by the permanent magnets 14. When the permanent magnets 14 are separated from the permeable plate 13 as shown on the right side of FIG. 1, on the other hand, the magnetic force applied to the chucking face 12 is reduced below a prescribed level so that the iron balls 15 are downwardly separated from the chucking face 12.

An embodiment of the present invention using such a principle is now described with reference to FIGS. 2 to 5.

Figure 2:
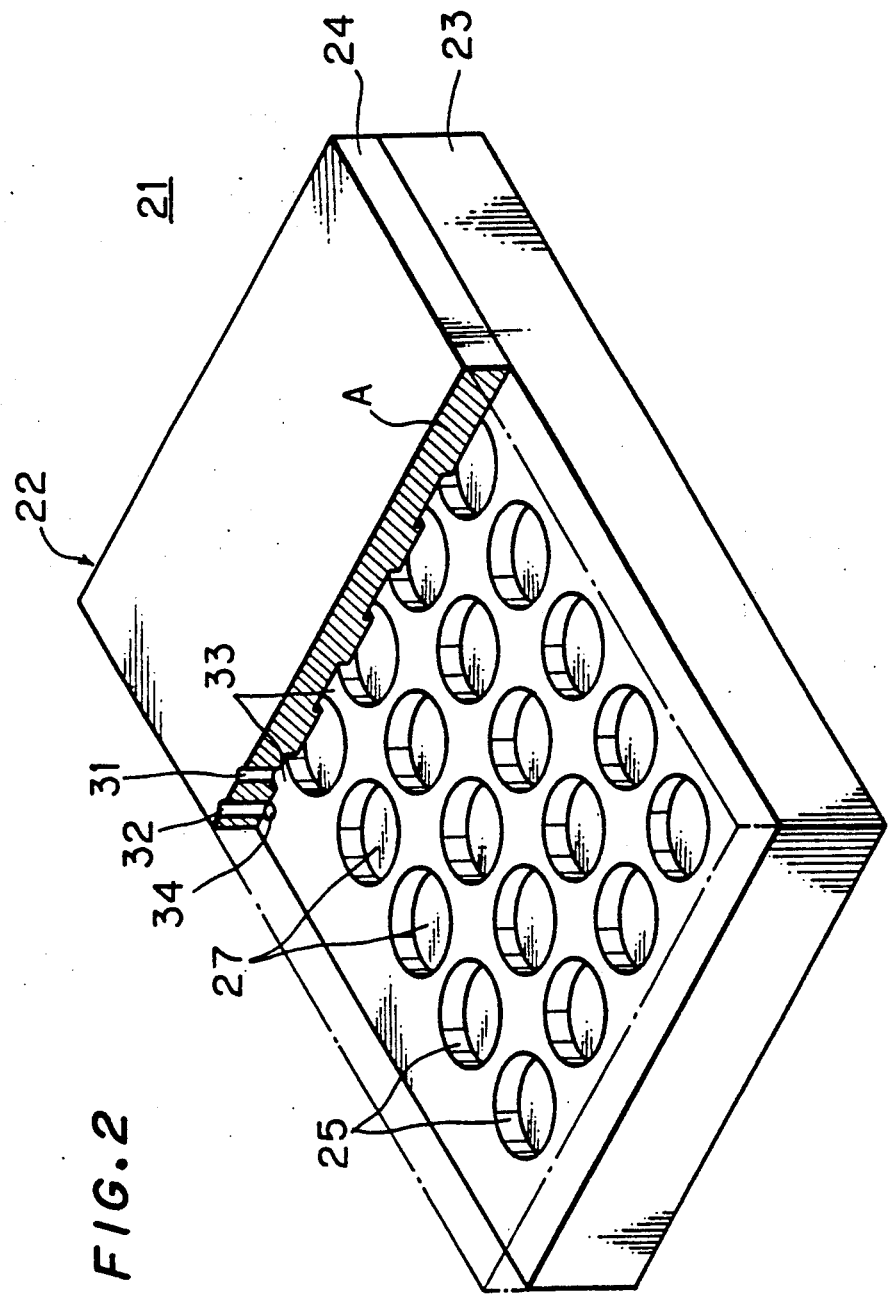
FIG. 2 is a perspective view showing a magnetic chuck 21 according to an embodiment of the present invention.
Figure 4:
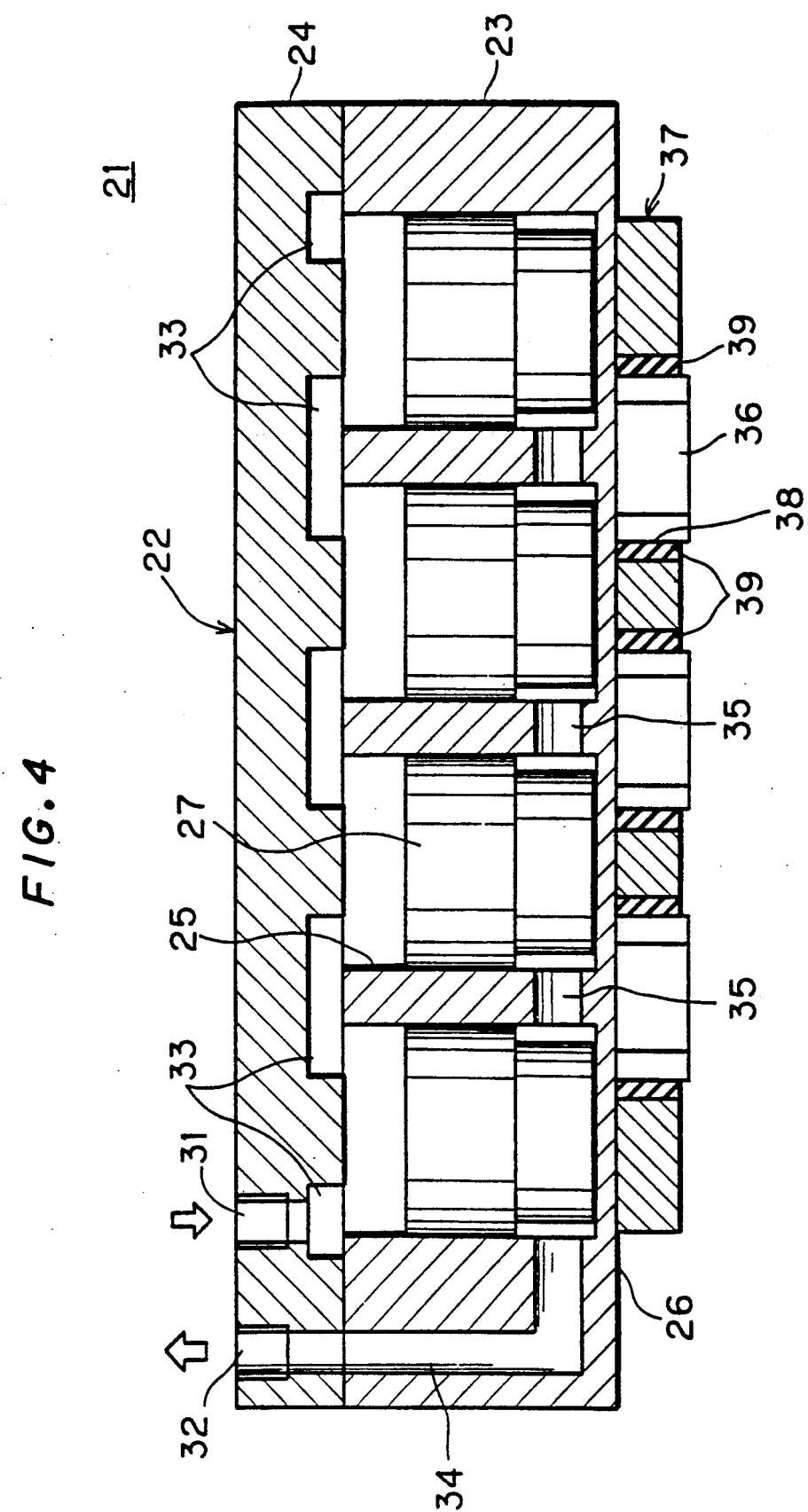
FIGS. 4 and 5 are sectional views taken along a section A in FIG. 2, showing on and off states of the magnetic chuck 21 respectively.
Figure 5:
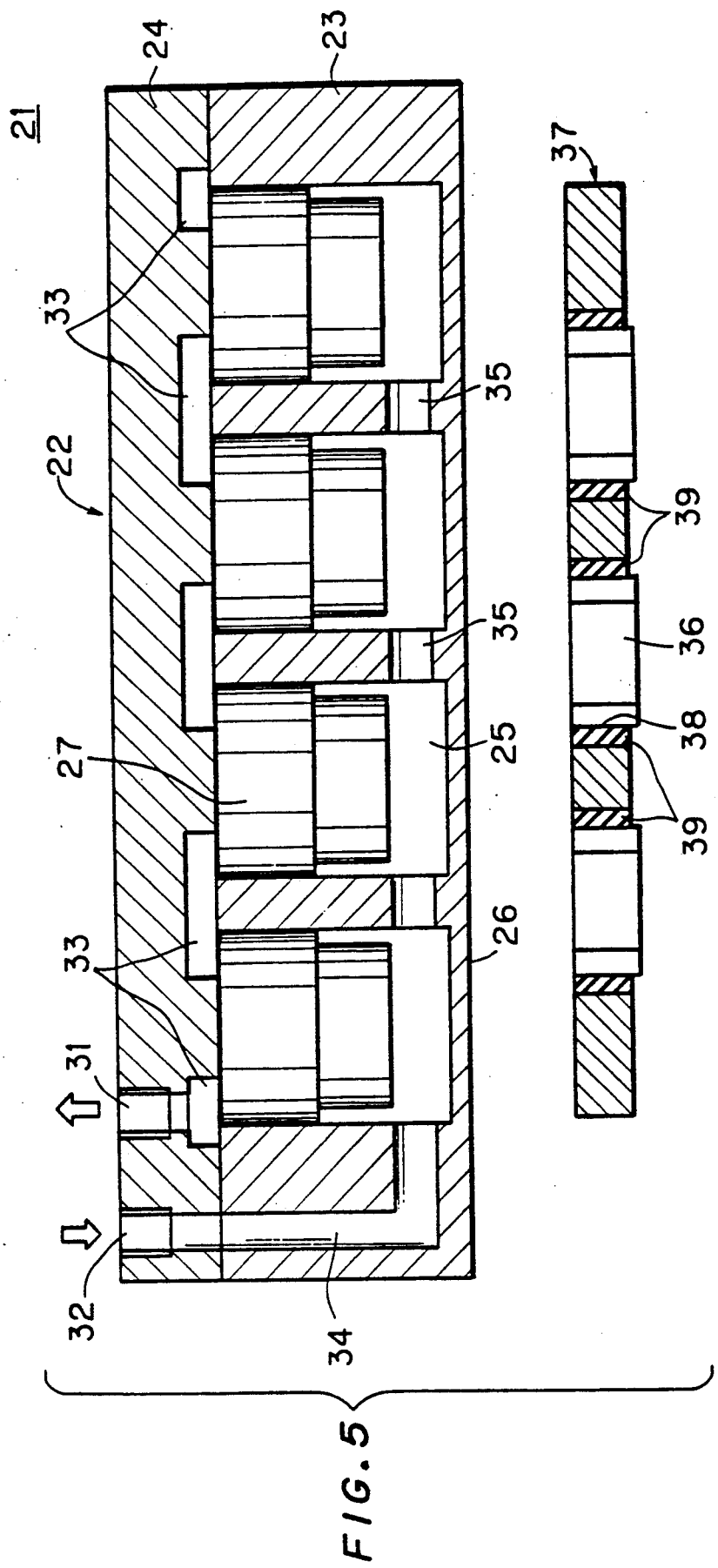
Figure 6:
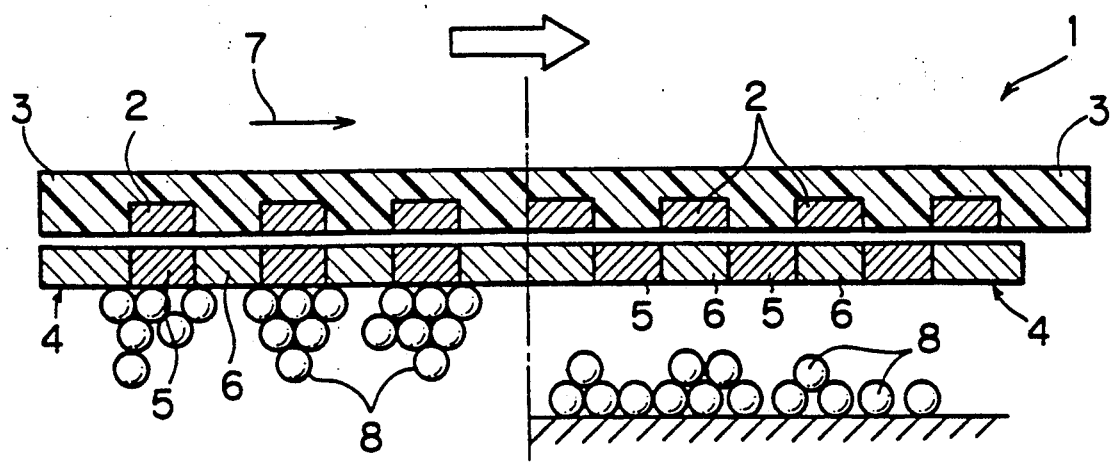
FIG. 6 is a principle diagram showing a conventional magnetic chuck 1.

FIG. 2 is a perspective view showing a magnetic chuck 21 according to this embodiment. This magnetic chuck 21 comprises a chuck body 22, which has a base 23 and a cover 24. Referring to FIG. 2, the cover 24 is partially fragmented along its section A. FIGS. 4 and 5 are sectional views taken along the section A of the chuck body 22.

A plurality of cylinders 25 are arranged in a plurality of rows and a plurality of columns to vertically extend through the base 23 of the chuck body 22. Each cylinder 25 is in the form of a drum having the same diameter from top to bottom. A chucking face 26 is provided on the lower surface of the chuck body 22, which is opposed to the bottom surfaces of the cylinders 25. The base 23 is made of a permeable material, which is preferably formed of stainless steel such as SUS304 (under Japanese Industrial Standards), for example.

Figure 3:
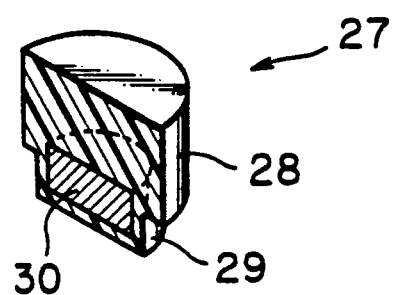
FIG. 3 is a half-sectional perspective view showing a piston 27.

Pistons 27 are vertically movably arranged in the cylinders 25 respectively. FIG. 3 independently shows a single piston 27 in a half-sectional perspective view. The piston 27 has a T-shaped sectional configuration, with a large-diameter part 28 and a small-diameter part 29 provided in upper and lower half portions thereof. A permanent magnet 30 is embedded in a lower part of the piston 27, while the remaining parts of the piston 27 are formed of resin, for example.

Pressures in the cylinders 25 are so controlled as to vertically move the pistons 27 in the cylinders 25. Such pressure control means is now described.

As shown in FIGS. 2, 4 and 5, the cover 24 of the chuck body 22 is provided with a first port 31 and a second port 32. The first port 31 is adapted to introduce fluid into upper portions of the cylinders 25. On the other hand, the second port 32 is adapted to introduce the fluid into lower portions of the cylinders 25.

The first port 31 directly communicates with the upper portion, more specifically the upper end surface, of a specific cylinder 25. The upper portion of this specific cylinder 25 successively communicates with the upper portions, more specifically the upper end surfaces, of the remaining cylinders 25 through bridge passages 33. On the other hand, the second port 32 first communicates with the lower portion, more specifically the lower side surface, of the specific cylinder 25 through an end passage 34. The lower portion of the specific cylinder 25 successively communicates with the lower portions, more specifically the lower side surfaces, of the remaining cylinders 25 through coupling passages 35. Thus, the upper portions and the lower portions of the entire cylinders 25 communicate with each other respectively.

Although only a pair of first and second ports 31 and 32 are illustrated in relation to one chuck body 22, a plurality of such pairs of first and second ports 31 and 32 are preferably provided for one chuck body 22, in order to quickly introduce and exhaust the fluid into and from all the cylinders 25.

Conduits (not shown) are coupled to the first port 31 and the second port 32 respectively, so that compressed air, for example, is introduced into either the first port 31 or the second port 32 through either conduit. At this time, a valve (not shown) is so switched as to exhaust air from the port which is supplied with no compressed air. The conduits connected to the first and second ports 31 and 32 can be selected in arbitrary lengths. Thus, it is possible to remotely control pneumatic pressures supplied to the first and second ports 31 and 32 through the conduits.

FIGS. 4 and 5 illustrate a holder 37 holding a plurality of electronic component chips 36, which are exemplary objects to be chucked by the magnetic chuck 21. This holder 37 is formed of a material which is attractable by magnetic force. Cavities 38 are provided in the holder 37 to receive the electronic component chips 36 one by one. Inner wall surfaces defining the cavities 38 are formed by elastic materials 39 such as rubber, for example, whereby the electronic component chips 36 are held in the cavities 38 by resilient force applied by the elastic materials 39.

The electronic component chips 36 held by the holder 37 in the aforementioned manner are subjected to various steps. The holder 37, holding the number of electronic component chips 36 in prescribed positions, enables efficient progress of such steps. For example, the electronic component chips 36 held by the holder 37 are subjected to a step of measuring characteristic values of the electronic component chips 36, a step of printing the product name and the like on the surfaces of the electronic component chips 36, a step of feeding the electronic component chips 36 to prescribed positions, and the like. Each of these steps is accompanied with the step of feeding the holder 37 holding the electronic component chips 36, and the magnetic chuck 21 can be advantageously employed in such a feeding step and the like.

FIG. 4 shows an on state of the magnetic chuck 21. At this time, compressed air is introduced from the first port 31 into the upper portions of the cylinders 25, whereby the pistons 27 are downwardly moved to come into contact with the bottom surfaces of the cylinders 25. Air currently remaining in the lower portions of the cylinders 25 is exhausted through the coupling passages 35, the end passage 34 and the second port 32.

In response to the downward movement of the pistons 27, the permanent magnets 30 (FIG. 3) embedded in the pistons 27 are approached to the chucking face 26, thereby supplying the chucking face 26 with magnetic force exceeding a prescribed level. Thus, the holder 37 holding the electronic component chips 36 is attracted by the chucking face 26.

FIG. 5 shows an off state of the magnetic chuck 21. In this state, compressed air is introduced from the second port 32 into the lower portions of the cylinders 25, whereby the pistons 27 are upwardly moved to come into contact with the upper end surfaces of the cylinders 28. At this time, air remaining in the upper portions of the cylinders 25 is exhausted from the first port 31. When the pistons 27 are upwardly moved, the permanent magnets 30 (FIG. 3) embedded therein are separated from the chucking face 26, to supply the chucking face 26 with no magnetic force exceeding the prescribed level. Thus, the holder 37 holding the electronic component chips 36 can be separated from the chuck body 22.

Thus, the states shown in FIGS. 4 and 5 are alternately repeated so that the magnetic chuck 21 can attract and release the holder 37.

While the present invention has been described with reference to the embodiment shown in the drawings, various modifications are available within the scope of the present invention.

For example, the outer configuration of the chuck body 22 is not restricted to the illustrated one but can arbitrarily be modified.

It is possible to arbitrarily change the number, density of distribution etc. of the cylinders 25 provided in the chuck body 22.

Further, the configuration of the pistons can also be arbitrarily changed in response to the designs of the cylinders 25 and the fluid passages provided in relation thereto.

Although compressed air is employed as the fluid for working the pistons 27 in the aforementioned embodiment, such fluid may be prepared from another gas or liquid.

The use of the magnetic chuck according to the present invention is not restricted to chucking of a holder holding electronic component chips, but the inventive magnetic chuck is applicable to various other uses.

Although the present invention has been described and illustrated in detail, it is clearly understood that the same is by way of illustration and example only and is not to be taken by way of limitation, the scope of the present invention being limited only by the terms of the appended claims.

What is claimed is:

1. A magnetic chuck comprising:
   a chuck body providing a chucking face on its lower surface and being formed with a plurality of cylinders vertically extending through its interior;
   pistons vertically movably provided in respective ones of said cylinders and having permanent magnets embedded therein; and
   means for controlling pressures in said cylinders for vertically moving said pistons in said cylinders, said controlling means comprising a first fluid passage comprising bridge passages coupling upper portions of said plurality of cylinders with each other for introducing fluid into upper portions of said cylinders;
   and a second fluid passage comprising coupling passages coupling lower portions of said plurality of cylinders with each other for introducing fluid into lower portions of said cylinders.

2. A magnetic chuck in accordance with claim 1, wherein said chuck body comprises a base which has a lower surface providing said chucking face and a cover which is placed on the upper surface of said base, and said cylinders are formed on said base to oppose bottom surfaces thereof to said chucking face so that upper surfaces of said cylinders are closed by said cover.

3. A magnetic chuck in accordance with claim 2, wherein said base is formed of a magnetically permeable material.

4. A magnetic chuck in accordance with claim 3, wherein said magnetically permeable material is stainless steel.

5. A magnetic chuck in accordance with claim 1, wherein said fluid is air.

6. In combination, a magnetic chuck as defined in claim 1; and a holder holding a plurality of electronic component chips, said holder having means coacting with said magnetic chuck for feeding said electronic component chips between said magnetic chuck and said holder.

7. A magnetic chuck comprising: a chuck body providing a chucking face on its lower surface and being formed with a plurality of cylinders vertically extending through its interior;
   pistons vertically movably provided in respective ones of said cylinders and having permanent magnets embedded therein, said pistons having large-diameter parts and small-diameter parts in upper and lower half portions thereof respectively;
   means for controlling pressures in said cylinders for vertically moving said pistons in said cylinders, said controlling means comprising a first fluid passage for introducing fluid into upper portions of said cylinders and second fluid passage for introducing fluid into lower portions of said cylinders;
   wherein said first fluid passage communicates with said cylinders on upper end surfaces of said cylinders, and said second fluid passage communicates with said cylinders on lower side surfaces of said cylinders.

8. A magnetic chuck in accordance with claim 7, wherein each said cylinder is in the form of a drum having the same diameter from top to bottom.

9. A magnetic chuck, comprising: a chuck body providing a chucking face on its lower surface and being formed with a plurality of cylinders vertically extending through its interior;
   pistons vertically movably provided in respective ones of said cylinders and having permanent magnets embedded therein, said pistons comprising resin parts in which said permanent magnets are embedded; and
   means for controlling pressures in said cylinders for vertically moving said pistons in said cylinders.

* * * * *